Dec. 17, 1929.  J. H. WAGENHORST  1,739,877
DEMOUNTABLE RIM AND FASTENING MEANS FOR THE SAME
Filed Oct. 13, 1924  2 Sheets-Sheet 1
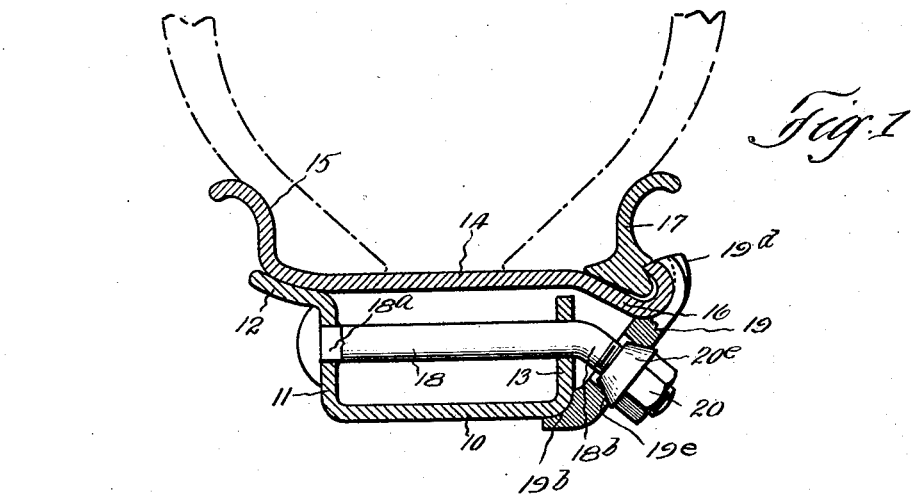
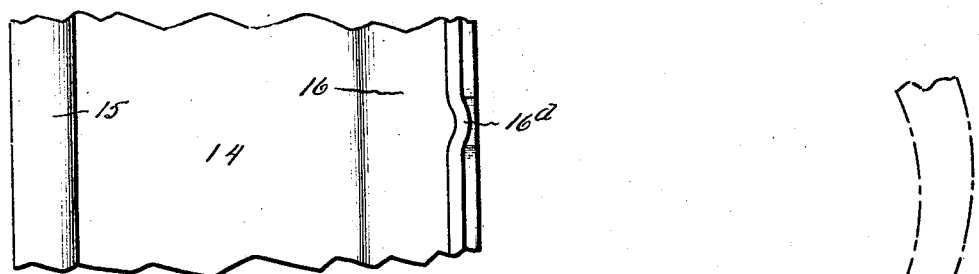
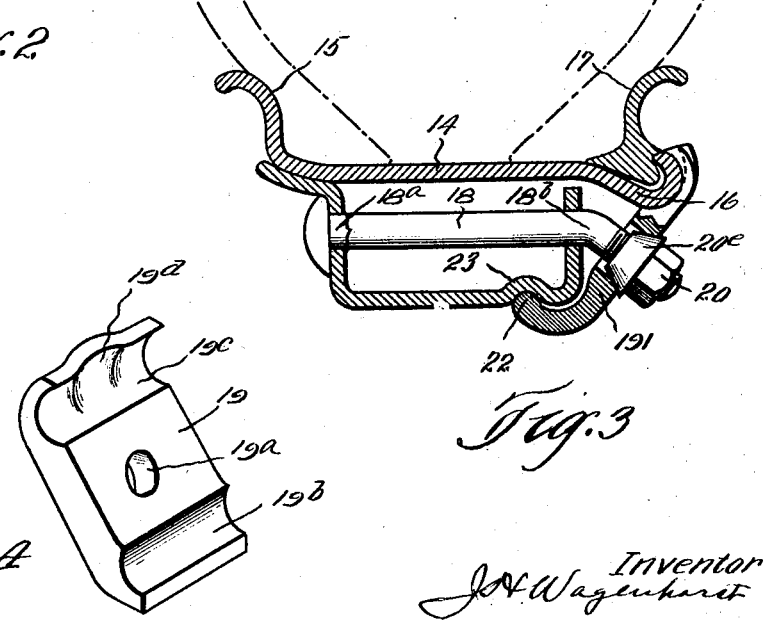

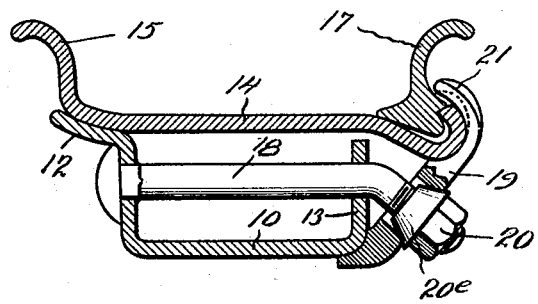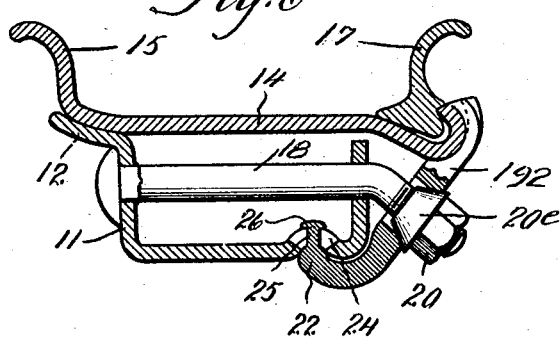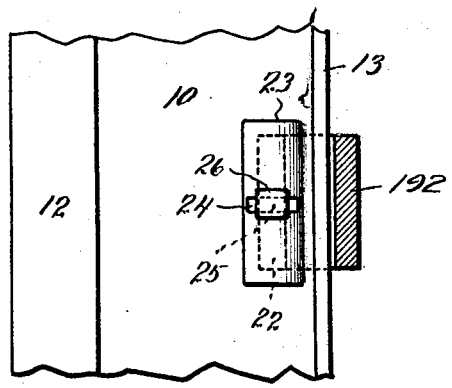

Patented Dec. 17, 1929

1,739,877

UNITED STATES PATENT OFFICE

JAMES H. WAGENHORST, OF JACKSON, MICHIGAN

DEMOUNTABLE RIM AND FASTENING MEANS FOR THE SAME

Application filed October 13, 1924. Serial No. 743,280.

This invention relates generally to automobile wheels and more particularly to a novel construction of demountable tire carrying rim and an improved means for securing and supporting the said rim.

Broadly speaking, the invention applies to both the fixed rim or felly of the wheel body, and the demountable tire carrying rim applied thereto.

These novel features are particularly adapted for use upon light weight trucks, but it will be understood, however, that they can also be used, and with equal facility, upon all types of motor vehicles.

The main objects of the invention are to provide a fixed and a demountable rim so constructed that there will be ample clearance to permit quick and easy mounting and demounting of the tire carrying rim; and also to provide fastening means whereby the tension of the nut against the clamping lug will help support the outer portion of the rim radially by the direct pull of the bolt, or at least that portion thereof which extends beyond the outer leg of the fixed rim; at the same time position the rim laterally, and providing the proper driving connection between the fixed and demountable rims.

In some instances it has been the practice to support a tire carrying rim from straight bolts, and the tendency of course has been to bend these bolts radially inwardly due to any undue load or pressure against the rim.

One object of the present invention is to avoid this difficulty and this I accomplish by bending the projecting ends of the bolts radially inwardly, this bolt serving as a truss or tie rod when brought into cooperative action with the two rims and the clamping lug and nut.

Another object of the invention is to so construct the clamping lug and a nut that they will be securely locked together and at the same time avoid large tolerances.

With these various objects in view the invention consists in the novel features of construction in the manner of combining and arranging the same all of which will be fully described hereinafter and set forth in the appended claims.

In the drawings forming a part of this specification, Fig. 1 is a transverse sectional view of a fixed and a demountable rim constructed in accordance with my invention and to which are applied my novel form of fastening means; Fig. 2 is a plan view of a portion of the demountable rim; Fig. 3 is a sectional view of a slight modification; Fig. 4 is a perspective view of the clamping lug showing the inner face thereof; Fig. 5 is a sectional view of a modified form of clamp; Fig. 6 is another form of clamp connected to the fixed rim or felly; and Fig. 7 is an inverted sectional plan view of said rim and clamping lug.

In carrying out my invention I employ a fixed rim 10 having the rear leg 11 terminating in a rim engaging flange 12, and the front leg 13, is of slightly less height than the leg 11, so that there will be ample clearance between the front portion of the demountable tire carrying rim 14 and the front leg of the fixed rim.

The demountable tire carrying rim 14 is shown as having a tire retaining flange 15 at the rear side, and the ring receiving groove 16 in the front side.

A detachable flange ring 17 split at one point is fitted into the grooved side of the demountable tire carrying rim, the ring 17 engaging the tire casing in exactly the same manner as the permanent flange 15. While I have shown my invention applied to a grooved rim having a detachable flange ring, it will be understood that it can be employed upon rims having permanent side flanges.

Bolts 18 are passed transversely through the fixed rim, the square shanks 18ª of the bolts being fitted into correspondingly shaped openings in the rear leg of the fixed rim. The outer ends of the bolts 18ᵇ are turned obliquely radially inwardly as shown, and fitting upon the inclined ends of the bolts, for the purpose of positioning, supporting and driving the demountable rim, I provide clamping lugs 19, the inner ends of which are shaped to fulcrum against the front leg of the fixed rim, while their outer ends engage the grooved side of the demountable rim and position and tension the rim upon the fixed rim or felly.

Each clamping lug 19 has a bolt hole 19$^a$, and at its inner end is recessed or grooved or curved as shown at 19$^b$ to fulcrum upon the corner of the fixed rim; while the outer end is curved or recessed or notched as indicated at 19$^c$ in order to provide an engagement between the supporting lug and the edge of the demountable rim.

In order to provide a highly efficient driving connection between the fixed and demountable rims through the medium of the clamping lugs and bolts and nuts, I form the outer edge of the grooved side of the rim with a slight outwardly projecting or protruding portion 16$^d$, which fits into a correspondingly shaped portion 19$^d$ formed in the outer end of the clamping lug, and this outwardly projecting portion of the rim fitting into the correspondingly shaped recessed portion of the clamp establishes the driving connection and prevents any circumferential movement of the outer end of the clamp with reference to the rim and the straight end of the clamp being in engagement with the leg of the felly holds the clamp against turning during the tightening operations.

Nuts 20 are screwed upon the ends of the bolts which project through the openings 19$^a$ and the inner ends of these nuts are made conical or spherical as indicated at 20$^e$ in order to seat firmly upon the counterbored portion 19$^e$ of the bolt hole in the clamping lug.

This construction of bolt and nut in connection with this form of clamp is highly advantageous inasmuch as the conical nut fills the space in the clamping lug and holds the same secure against vibration. The conical nut also acts as a lock to prevent loosening.

The bolt being bent after its application to the wheel, requires no further upsetting of the square shank at the head for the purpose of retaining its position in the felly, as the bending of the bolt automatically secures it in position in the felly.

Producing the slight bump or projection in the outer edge of the rim does not in any way impair the strength of the rim and the operation can be quickly and easily accomplished. The clamping lugs are preferably made from rolled bar stock and in the punching operation the corresponding bump or projection 19$^d$ can be produced in the outer end of the clamping lug.

In operation the tire carrying rim 14 is placed upon the fixed rim or felly of the wheel body, its rear edge engaging the flange 12 upon the rear leg of the fixed rim or felly, there being plenty of clearance between the rim base and the outer edge of the front leg of the fixed rim or felly.

The clamping lugs are then fitted upon the inclined ends of the bolts, the inner ends of said clamping lugs fitting against the front leg of the felly or fixed rim at its juncture with the base of the fixed rim, while the outer ends of the clamping lugs engage the grooved side of the demountable tire carrying rim; and this rim being applied to the felly in a definite position determined by the valve and valve stem; the recessed or notched portions 19$^d$ of the clamping lugs will fit upon the outwardly punched or protruding portions 16$^d$ of the rim and thereby complete the relative positioning of the clamp and rim.

Nuts are then applied and the clamping lugs are caused to bear upon the fixed rim or felly at their inner ends, and against the front edge of the demountable tire carrying rim at their outer ends so that the rim is pushed into seating engagement with the flanged side of the fixed rim, and is tensioned and supported at the front side by the clamps. At the same time the proper driving connection is established and twisting movement of the clamp, due to torque, entirely eliminated. The ends of the bolts being inclined and the clamping lugs fulcruming as they do against the fixed rim and moving radially outwardly substantially in line with the axis of the inclined bolt the full pull of the bolt is obtained and a thrust or truss action, to a certain extent, is obtained due to the inclination of the bolt ends and the action of the nut upon the clamp.

In case additional lateral support should be desired for the detachable ring 17, it may be obtained by forming the outer ends of the clamps with a slight extension as indicated at 21 in Fig. 5 which extended end is given the proper curvature to engage the detachable flange ring at the same time that it contacts with the grooved edge of the rim base and the protruding portion thereof.

In Fig. 3 I have shown a very slight modification of the broad conception, this modification being intended to provide for a slightly increased leverage upon the clamping lug. This I accomplish by providing the inner end of the lug 191 with a slight extension 22 which fulcrums in a recess 23 formed in the base of the fixed rim or felly by punching said base radially outwardly in order to provide the fulcruming depression. This arrangement slightly increases the distance between the fulcrum point and the center of the bolt, thereby increasing the pull of the nut against the clamp in proportion to its relation to the fixed rim or felly with respect to the rim. No sliding action of the clamp against the base of the rim is intended.

In Figs. 6 and 7 I have shown a slight modification of the construction shown in Fig. 3, this modification consisting in slotting the fulcrum recess as indicated at 24 and providing the fulcrum end 22 with a pin 25 which works in said slot, which pin is headed down within the fixed rim or felly as indicated at 26.

This makes a suitable connection between the clamp 192 and fixed rim and prevents the possibility of losing the clamp, inasmuch as it is always connected to the fixed rim or felly, but in such a manner that it can be loosened or tightened as desired in order to demount or replace the rim.

It will therefore be seen that I utilize the inclination of the bolts in combination with the clamping lugs which fulcrum against the fixed rim or felly and support the front side of the demountable rim maintaining at the same time a driving connection between the fixed and demountable rims by virtue of the interengaging construction of the rim and lug. It will also be noted that the movement of the clamping lug upon the inclined bolt positions, tensions and supports the demountable rim, and that the cooperation of the conical nut and counterbored seat provides a positive lock between these parts preventing displacement due to vibration and keeps down large tolerances between the clamping lug and bolt. The clamping lug fulcruming on the fixed rim and held in locked relation on the demountable rim completely avoids the possibility of shifting due to torque.

Ample clearance is provided between the front leg and rim and consequently the tire rim can be quickly and easily mounted and demounted.

Having thus described my invention, what I claim is:—

1. The combination with a fixed rim having a slotted fulcruming depression, of a clamping lug having an extension at its inner end, said extension being provided with a pin adapted to work in said slot, said pin being headed to prevent disconnection of the clamping lug from the fixed rim.

2. The combination with a fixed rim having a plurality of slotted fulcruming depressions, of a plurality of clamping lugs each having an extension at its inner end adapted to fit in one of said depressions, and a pin working in the slot, said pin being headed whereby disconnection between the clamping lug and fixed rim is prevented, bolts passing through the fixed rim and the clamping lugs, a demountable tire carrying rim the front side of which is engaged by the outer ends of the clamping lugs and nuts for holding the clamping lugs in engagement with the demountable rim.

3. The combination of a fixed rim of channel formation having one leg provided with a rim-supporting seat, a demountable rim mounted on said seat and projecting laterally beyond the front leg of said fixed rim, bolts passing through the fixed rim and having their front ends bent toward the rim center, clamps on said bolts, the inner ends of said clamps fulcruming on the fixed rim and their outer ends having a supporting and driving connection with the demountable rim, and nuts screwed on the front ends of said bolts and engaging said lugs, whereby the forward ends of said bolts are put in tension to support the front side of the rim.

4. The combination of a fixed rim having a rim-supporting seat, bolts passing through said fixed rim and having their front ends bent inwardly, a demountable rim mounted on said seat, and provided with an inwardly-projecting groove at its front side adapted to receive a detachable ring, the portion of said demountable rim forming the groove having projections, clamps arranged on the front ends of said bolts and having recessed portions receiving said projections, and nuts screwed on said bolts and engaging said clamps, whereby the front ends of said bolts are put in tension to support the front side of the rim.

5. The combination of a fixed rim having depressions in the base thereof, a demountable rim mounted on said fixed rim, bolts passing through the fixed rim and having their front ends bent toward the rim center, clamps arranged upon the front ends of said bolts, the inner ends of said clamps being shaped to engage the said depressions and their outer ends being shaped for engagement with the front side of the demountable rim, and nuts on said bolts engaging said clamps.

6. The combination of a fixed rim, a demountable rim mounted thereon and having a protuberance at the front side thereof, a bolt passing through the fixed rim, a clamp arranged on the bolt and having its outer end recessed to receive said protuberance, and a nut on said bolt engaging said clamp.

7. The combination of a fixed rim of channel formation having a substantially straight-faced front leg, a demountable rim mounted on said fixed rim and substantially wider than the latter, bolts extending transversely of said fixed rim and having their forward ends inclined toward the axis of the rim, clamps loosely mounted on the forward ends of said bolts, the inner ends of said clamps fulcruming on the base of the fixed rim while the outer ends engage and interlock with the front side of the demountable rim, and nuts on said bolts engaging said clamps whereby the forward ends of said bolts are put in tension to support the front side of the rim.

8. The combination of a fixed rim of channel formation having a substantially straight-faced front leg, a demountable rim mounted on said fixed rim and substantially wider than the latter, bolts extending transversely of said fixed rim and having their forward ends inclined toward the axis of the rim, clamps loosely mounted on the forward ends of said bolts, the inner ends of said clamps fulcruming on the base of the fixed rim while the outer ends engage the front side of the demountable rim, and nuts on said bolts engaging said clamps whereby the forward ends of said bolts are put in tension to support the front side of the rim.

In testimony whereof, I hereunto affix my signature.

JAMES H. WAGENHORST.